(12) United States Patent
Jones

(10) Patent No.: US 11,370,201 B2
(45) Date of Patent: Jun. 28, 2022

(54) ADHESION MEMBRANE TECHNOLOGY

(71) Applicant: The Boeing Company, Chicago, IL (US)

(72) Inventor: Timothy Jones, Charleston, SC (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/510,411

(22) Filed: Jul. 12, 2019

(65) Prior Publication Data

US 2021/0008848 A1    Jan. 14, 2021

(51) Int. Cl.
 *B32B 27/08*  (2006.01)
 *B32B 7/12*  (2006.01)
 *B64D 11/00*  (2006.01)

(52) U.S. Cl.
 CPC ............. *B32B 27/08* (2013.01); *B32B 7/12* (2013.01); *B64D 11/00* (2013.01); *B32B 2255/10* (2013.01)

(58) Field of Classification Search
 None
 See application file for complete search history.

(56) References Cited

U.S. PATENT DOCUMENTS

| | | | |
|---|---|---|---|
| 5,593,759 A * | 1/1997 | Vargas | C09J 7/20 428/200 |
| 6,565,969 B1 * | 5/2003 | Lamon | C09J 7/10 428/349 |
| 2007/0056687 A1 * | 3/2007 | Brinner | B32B 37/24 156/292 |

* cited by examiner

*Primary Examiner* — Chinessa T. Golden
(74) *Attorney, Agent, or Firm* — MH2 Technology Law Group LLP

(57) ABSTRACT

An adhesive membrane that includes a plurality of spherical particles bonded together so as to form interstitial gaps between the spherical particles. The plurality of spherical particles comprise an adhesive and form a lattice. The interstitial gaps are a size that is larger than a water vapor molecule.

20 Claims, 4 Drawing Sheets

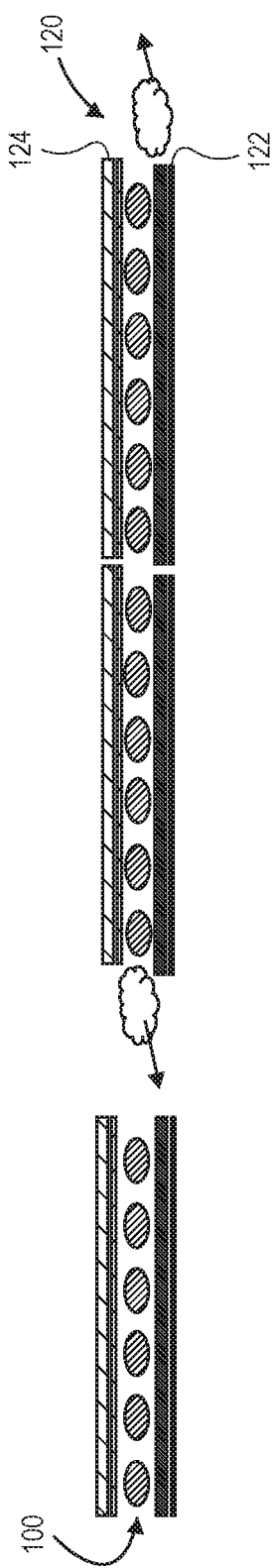

ADHESION MEMBRANE TECHNOLOGY

DETAILED DESCRIPTION

Field of the Disclosure

The present disclosure is directed to an adhesion membrane that is useful for bonding substrates.

Background

When adhesives are used to bond substrates, air and/or water can become trapped between the substrates. In some cases, this can cause unwanted bubble formation and/or partial delamination of the substrates. This can be a particular problem in situations where the bonded substrates are exposed to changes in atmospheric pressure, such as is the case with aerospace vehicles, including both aircraft and space vehicles.

As an example, in cases where galley mats on aerospace vehicles are improperly cleaned or installed, air, moisture or other liquids can become entrapped between the galley mat and the underlying floor panels or inserts to which the galley mat is adhered. The air and moisture expand, such as during a decrease in air pressure, and can cause air bubbles and/or buckling of the flooring. Such damage to galley mats can be unsightly and can be a potential hazard due to the possibility of injury from tripping, falling or other accidents caused by the uneven galley mats. Replacing the mats can lead to higher cost, rework and dissatisfied aerospace vehicle customers.

Thus, there is a need in the art for materials and techniques that can reduce or eliminate damage to flooring caused by trapped air, moisture and other liquids.

SUMMARY

The present disclosure is directed to an adhesive membrane. The membrane comprises a plurality of spherical particles bonded together so as to form interstitial gaps between the spherical particles, the plurality of spherical particles comprising an adhesive and forming a lattice. The interstitial gaps are a size that is larger than a water vapor molecule.

The present disclosure is also directed to a structure. The structure comprises: a first substrate; a second substrate; and an adhesive membrane bonding the first substrate to the second substrate. The adhesive membrane comprises a plurality of spherical particles bonded together so as to form interstitial gaps between the spherical particles, the plurality of spherical particles comprising an adhesive and forming a lattice. The interstitial gaps are a size that is larger than a water vapor molecule.

The present disclosure is also directed to a method. The method comprises bonding a first substrate to a second substrate with an adhesive membrane. The adhesive membrane comprises a plurality of spherical particles bonded together so as to form interstitial gaps between the spherical particles, the plurality of spherical particles comprising an adhesive and forming a lattice. The interstitial gaps are a size that is larger than a water vapor molecule.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

FIG. 4 illustrates a sandwich structure comprising a first substrate, a second substrate and an adhesive membrane, according to an example of the present disclosure.

Figure 1:
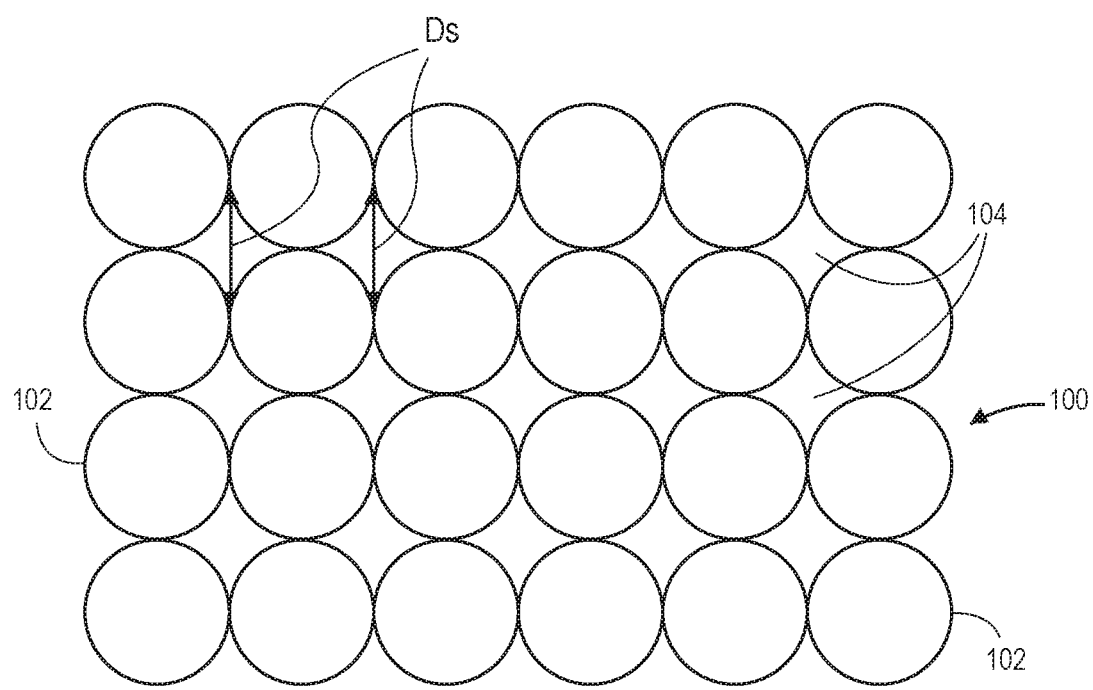
FIG. 1 illustrates a schematic, side view of an adhesive membrane, according to an example of the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure relates to an adhesive membrane technology wherein the adhesive membrane comprises spherical particles of adhesive having interstitial spaces therebetween that are smaller than the average water droplet, but larger than a water vapor molecule. The spherical particles are bonded together to form a lattice with a limited amount of interstitial space between the spherical particles. This prevents or reduces the ability of a liquid to flow into the adhesive and/or reduces the amount of space in the adhesive available for trapping liquids, such as water or beverages such as tea, coffee, soda and other liquid beverages, while still allowing water vapor and other gases to escape through the adhesive membrane. The result is less water vapor, air and other gases trapped in the adhesive membrane and/or between the adhesive membrane and the substrate(s) bonded with the adhesive membrane. This, in turn, results in less bubbling and/or buckling of the substrate(s).

Figure 2:
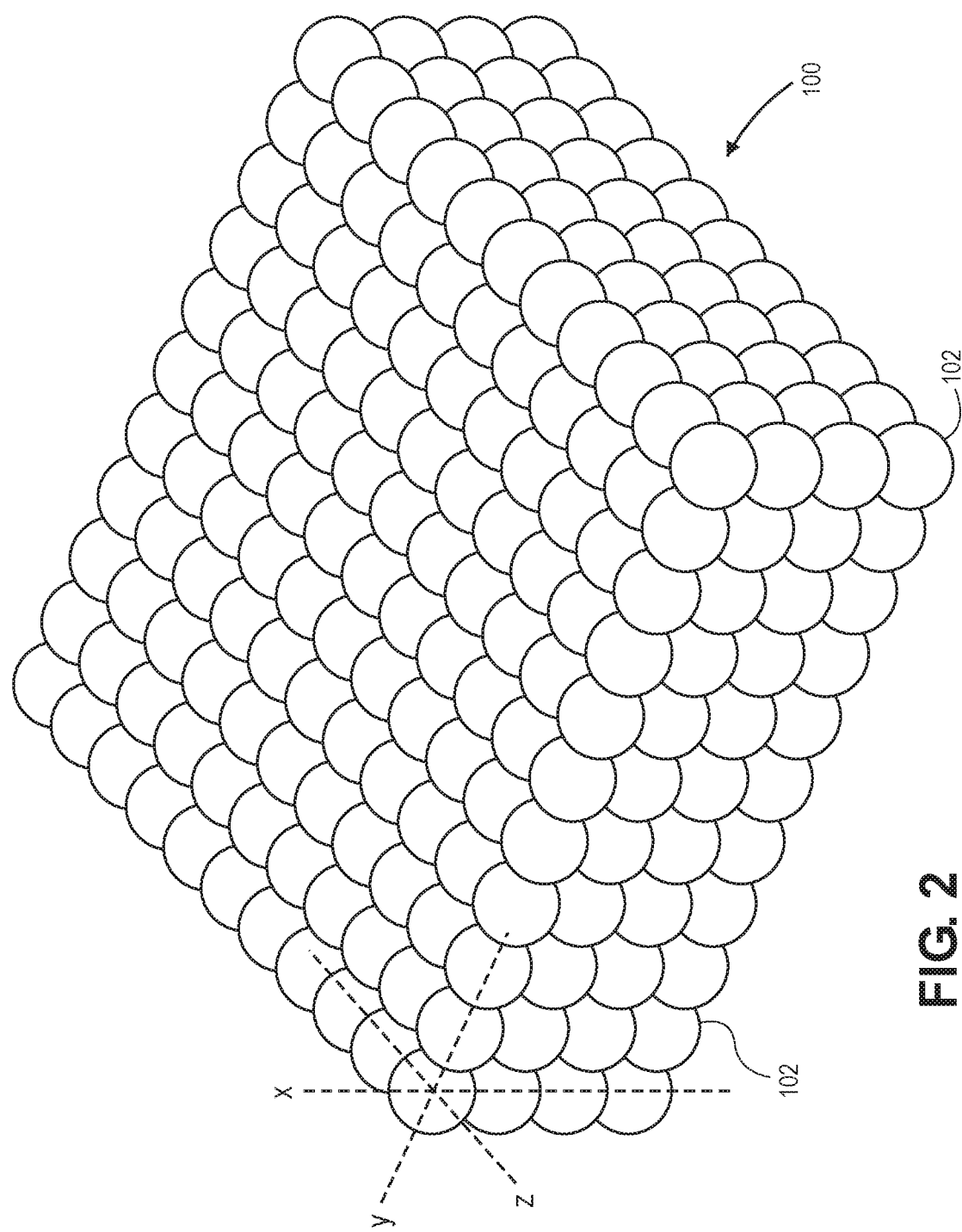
FIG. 2 illustrates a perspective view of an adhesive membrane, according to an example of the present disclosure.

FIG. 1 illustrates a schematic, side view of an adhesive membrane 100, according to an example of the present disclosure. The adhesive membrane 100 comprises a plurality of spherical particles 102 bonded together so as to form interstitial gaps 104 between the spherical particles, the plurality of spherical particles 102 comprising an adhesive and forming a lattice structure. FIG. 2 illustrates a perspective view of the adhesive membrane 102 that more clearly shows the lattice arrangement of the plurality of spherical particles 102.

The spherical particles 102 can be spheres, or can be substantially spherical (e.g., are generally rounded in the shape of a sphere but are not perfect spheres due to indentations, chips, rough surfaces or other imperfections). Further, the spherical particles can have an oval shape.

As shown in FIG. 1, the interstitial gaps 104 have an average size, $D_s$, that is larger than a water vapor molecule (e.g., about 2.75 angstroms), while being small enough to prevent or reduce the ability of a liquid to flow into the adhesive and/or reduce the amount of space in the adhesive available for trapping liquids. $D_s$ is defined herein as the average size of the largest gap between adjacent spherical particles 102 in the membrane 100. As examples, the upper limit for $D_s$ can be about 1 mm, such as an upper limit of about 500 nm, about 100 nm, about 50 nm, about 100 angstroms, about 50 angstroms, about 20 angstroms, about 10 angstroms or about 5.5 angstroms. For example, the values for the interstitial gaps 104 average size, $D_s$, can range from about 2.75 angstroms to about 1 mm, such as about 3 angstroms to about 100 angstroms, or about 4 angstroms to about 5.5 angstroms. In one example, the value of the interstitial gap 104 average size, Ds, ranges from about 2.75 angstroms to about 5.5 angstroms.

The size, $D_s$, of the interstitial gaps 104 can be varied, for example, by selecting the size (e.g., diameter) of the spherical particles 102. The size of the spherical particles 102 may optionally be substantially uniform, as shown in FIG. 1. In an example, the plurality of spherical particles 102 have a number average particle size ranging from about 0.5 nm to about 2, or from about 0.5 nm to about 3 mm, such as from about 1 nm to about 1 mm, or about 50 nm to about 500 nm, or about nm 250 to about 300 nm. In another example, the plurality of spherical particles 102 have a number average particle size ranging from about 250 to about 275 nm. In some cases, such as where the membrane is printed using 3D printing, as discussed below, the number average particle size of the spherical particles 102 may be known. In cases where the number average particle size of the spherical particles is not known, the number average particle size can be determined by, for example, atomic force microscopy, using techniques that are well known in the art. The values for $D_s$ can be calculated, for example, based on the size of the particles and the known lattice structure of the adhesive membrane.

In an example, the number of spherical particles are present in a single layer of the membrane in an amount of not less than about 1 million per square foot or more. For example, the spherical particles can be present in a single layer in an amount ranging from about 1 million to about 50 million per square foot, such as about 50 million to about 500 million per square foot, or a about 500 million to about 1 billion per square foot.

The material for the spherical particles 102 is chosen so as to be capable of holding its shape (e.g., sphere, oval or other), so as to be capable of forming particles have nanometer size diameters, and to have the desired adhesive properties where the adhesive properties are activate while the adhesive is in an essentially solid form. In an example, the adhesive is selected from the group consisting of silicone adhesives, acrylic adhesives, epoxy adhesives, cyanoacrylate adhesives, polyurethane adhesives, polyester adhesives, isocyanate adhesives or blends of two or more thereof. Other adhesive resins that exhibit the desired adhesion while in solid form can also be employed. In an example, the adhesive is a pressure sensitive adhesive.

The spherical particles 102 can be made entirely of an adhesive material. Such adhesive spherical particles may be made, for example, by 3D printing, by growth of the spherical particles in solution, or by any other technique capable of forming spherical particles. Alternatively, the spherical particles 102 can comprise a plurality of materials. For example, composite spherical particles can be in the form of core-shell type particles. The core-shell particles comprise a core particle material coated with an adhesive material that forms the shell. The core particle material can be any inorganic or organic material, such as particles comprising metals, metal oxides, semiconductors, oxides of semiconductors, carbon, polymers and so forth. The adhesive material employed for the shell of the core-shell particle can be any suitable adhesive, such as any of the adhesive materials described herein.

The spherical particles can be elastic or inelastic, depending on the materials employed. Thus, the spherical particles may or may not deform under a compressive stress. In an example, the spherical particles 102 and the adhesive membrane 100 will generally maintain its shape sufficiently so as to maintain the size of spaces between the spherical particles 102 that will reduce or inhibit the flow of water into the adhesive membrane 100 while allowing gas vapors to flow through the adhesive membrane.

Referring to FIG. 2, the adhesive membrane 100 has four layers of spherical particles through its thickness, but can include any number of layers of spherical particles 102 to provide any desired thickness. For example, the adhesive membrane 100 can be from 1 to 1000 layers thick, such as 2 to 200 layers thick or 3 to 100 layers thick.

Figure 3:
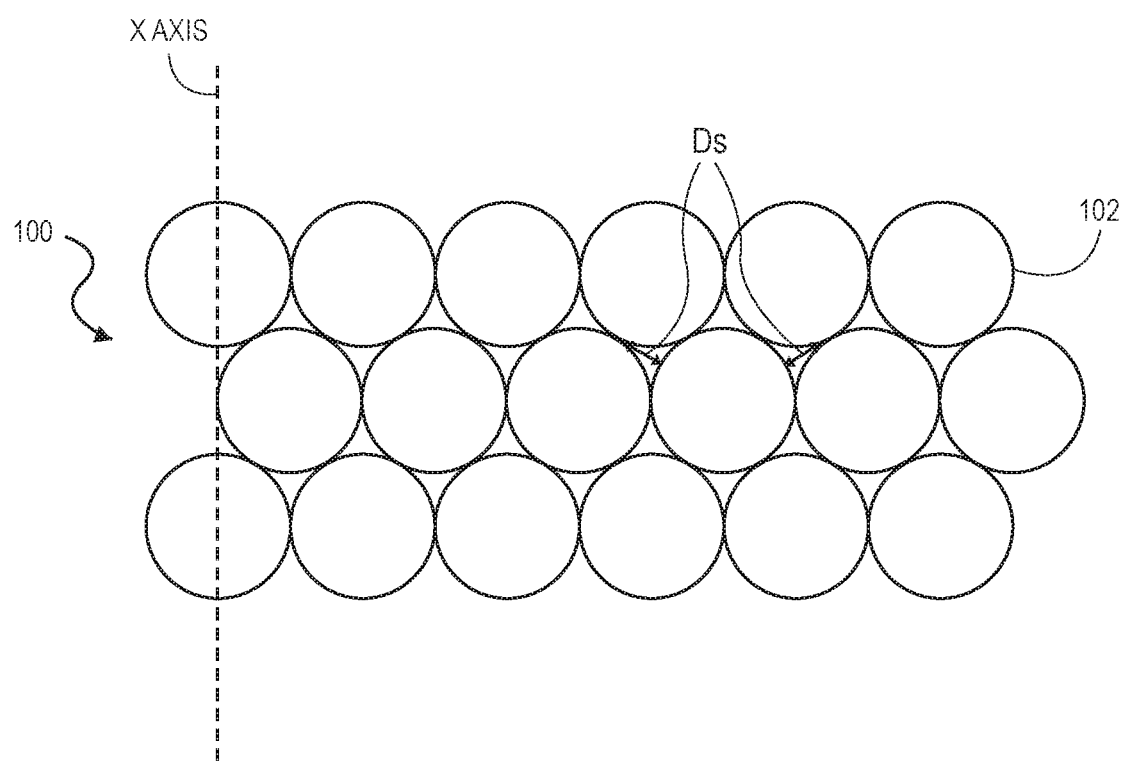
FIG. 3 illustrates a schematic, side view of an adhesive membrane comprising spherical particles, according to an example of the present disclosure.

The lattice structure of the adhesive membrane 100 can be arranged in any desired manner that will provide the desired size of spacing, $D_s$, between the particles. For example, the spherical particles 102 of FIG. 2 are arranged so that a diameter of the spherical particles in every layer is substantially aligned along an axis, X, in a direction of thickness of adhesive membrane 100, as well as along a Y and Z axis. FIG. 3 illustrates an adhesive membrane 100 comprising spherical particles arranged so that a diameter of the spherical particles 102 in every other layer is aligned along the X axis in a direction of thickness of adhesive membrane 100. Any other arrangements of the spherical particles 102 that provide the spacing, Ds, sized sufficiently so as to allow vapor flow through the adhesive membrane 100 while reducing or eliminating liquid (e.g., water) in the adhesive membrane 100 can also be employed.

The adhesive membrane 100 can be applied in any desired manner to a substrate. As an example, the adhesive membrane 100 can be formed by 3D printing of the spherical particles in the desired lattice structure. The adhesive membrane can initially be formed on a sacrificial substrate, such as a flexible liner having a non-stick surface that will allow the liner to be removed from the adhesive membrane prior to application to the surface(s) to be bonded. Alternatively, the adhesive membrane can be formed directly onto a surface to be bonded, such as by 3D printing or any other method, such as by spray techniques and so forth.

The present disclosure is also directed to sandwich structure in which the adhesive membrane is employed. FIG. 4 illustrates such a sandwich structure 120 comprising a first substrate 122, a second substrate 124 and an adhesive membrane 100 bonding the first substrate 122 to the second substrate 124. The adhesive membrane 100 comprises a plurality of spherical particles 102 bonded together so as to form interstitial gaps 104 between the spherical particles. The plurality of spherical particles 102 form a lattice and comprise an adhesive, such as any of the adhesives described herein. As also described herein, the interstitial gaps 104 have a dimension, $D_s$, between the spherical particles 102 that is larger than a water vapor molecule. Any of the numerical ranges described herein for x can be employed.

First substrate 122 and second substrate 124 can be any substrates that can be adhered together using the adhesive membrane 100 of the present disclosure. At least one of the substrates 122 and 124 can be air tight, thereby being capable of trapping air and forming air bubbles. In an example, the first substrate 122 is a floor panel of an aerospace vehicle and the second substrate 124 is a galley mat or other air tight, flexible flooring that is susceptible to bubble formation. Galley mats are generally water tight as well as air tight, and are capable of trapping air.

The present disclosure is also directed to a method. The method comprises bonding a first substrate to a second substrate with an adhesive membrane. The adhesive membrane comprises a plurality of spherical particles bonded together so as to form interstitial gaps between the spherical particles, the plurality of spherical particles comprising an adhesive and forming a lattice, wherein the interstitial gaps are a size that is larger than a water vapor molecule, such as any of the values for Ds disclosed herein.

The adhesive membranes of the present disclosure can be employed for bonding together any substrates where possible entrapment of air, water or other fluids may be problematic. Examples include use of the adhesive membrane for bonding any type of flooring, such as galley mats, vinyl or other flooring to a subfloor of a building, aerospace vehicle, boat or other structure. Another example employs an adhesive membrane of the present disclosure for bonding wallpaper to the wall of a building, aerospace vehicle, boat or other structure. In one example, the adhesive membrane is positioned between a galley mat and a floor panel on an aerospace vehicle. In an example, a structure is included comprising a first substrate and a second substrate and an adhesive membrane bonding the first substrate to the second substrate, wherein the first substrate is a floor panel of an aerospace vehicle and the second substrate is a galley mat. The adhesive membrane can be any of the adhesive membranes described herein. One of ordinary skill in the art would be able to determine other applications for the adhesive membranes of the present disclosure.

Prophetic Example

An adhesion membrane is made using an additive manufacturing process based on a digital file. Successive layers of an adhesive material are printed to form a layer of closely packed spherical particles. The printing is continued to form a desired number of the spherical particle layers, until a desired thickness of the adhesion membrane is realized. Each of the layers can be seen as a thinly sliced horizontal cross-section of the adhesion membrane.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An adhesive membrane, comprising:
a plurality of spherical particles that comprise adjacent particles bonded together so as to form interstitial gaps between the plurality of spherical particles, the plurality of spherical particles comprising an adhesive and forming a lattice, wherein the adjacent particles are in direct physical contact, the adhesive exhibiting a property of being an activated adhesive while in solid form;
wherein the interstitial gaps are a size that is larger than a water vapor molecule.

2. An adhesive membrane in accordance with claim 1, wherein the spherical particles are present in a single layer of the membrane in an amount ranging from about 1 million per square foot to about 1 billion per square foot.

3. An adhesive membrane in accordance with claim 1, wherein the interstitial gaps have an average size, $D_s$, ranging from about 2.75 angstroms to about 1 mm.

4. An adhesive membrane in accordance with claim 1, wherein the interstitial gaps have an average size, $D_s$, ranging from about 2.75 angstroms to about 5.5 angstroms.

5. An adhesive membrane in accordance with claim 1, wherein the plurality of spherical particles have a number average particle size ranging from about 0.5 nm to about 3 mm.

6. An adhesive membrane in accordance with claim 1, wherein the plurality of spherical particles have a number average particle size ranging from about 1 nm to about 1 mm.

7. An adhesive membrane in accordance with claim 1, wherein the adhesive is selected from the group consisting of silicone adhesives, acrylic adhesives, epoxy adhesives, cyanoacrylate adhesives, polyurethane adhesives, polyester adhesives, isocyanate adhesives or blends of two or more thereof.

8. An adhesive membrane in accordance with claim 7, wherein the adhesive is a pressure sensitive adhesive.

9. An adhesive membrane in accordance with claim 1, wherein the adhesive membrane is positioned between a galley mat and a floor panel on an aerospace vehicle.

10. A structure, comprising:
a first substrate;
a second substrate; and
an adhesive membrane bonding the first substrate to the second substrate, the adhesive membrane comprising:
a plurality of spherical particles that comprise adjacent particles bonded together so as to form interstitial gaps between the plurality of spherical particles, the plurality of spherical particles comprising an adhesive and forming a lattice, wherein the adjacent particles are in direct physical contact, the adhesive exhibiting a property of being an activated adhesive while in solid form, wherein the interstitial gaps are a size that is larger than a water vapor molecule.

11. The structure in accordance with claim 10, wherein the first substrate is a floor panel of an aerospace vehicle and the second substrate is a galley mat.

12. The structure in accordance with claim 10, wherein the interstitial gaps have an average size, $D_s$, ranging from about 2.75 angstroms to about 1 mm.

13. The structure in accordance with claim 10, wherein the plurality of spherical particles have a number average particle size ranging from about 0.5 nm to about 3 mm.

14. The structure in accordance with claim 10, wherein the plurality of spherical particles have a number average particle size ranging from about 1 nm to about 1 mm.

15. The structure in accordance with claim 10, wherein the adhesive is selected from the group consisting of silicone adhesives, acrylic adhesives, epoxy adhesives, cyanoacrylate adhesives, polyurethane adhesives, polyester adhesives, isocyanate adhesives or blends of two or more thereof.

16. The structure in accordance with claim 10, wherein the adhesive is a pressure sensitive adhesive.

17. A method, comprising:
bonding a first substrate to a second substrate with an adhesive membrane, the adhesive membrane comprising:
a plurality of spherical particles that comprise adjacent particles bonded together so as to form interstitial gaps between the spherical particles, the plurality of spherical particles comprising an adhesive and forming a lattice, wherein the adjacent particles are in direct physical contact, the adhesive exhibiting a property of being an activated adhesive while in solid form,
wherein the interstitial gaps are a size that is larger than a water vapor molecule.

18. The method in accordance with claim 17, wherein the first substrate is a floor panel of an aerospace vehicle and the second substrate is a galley mat.

19. The method in accordance with claim 17, wherein the interstitial gaps have an average size, $D_s$, ranging from about 2.75 angstroms to about 1 mm.

20. The method in accordance with claim 17, wherein the plurality of spherical particles have a number average particle size ranging from about 0.5 nm to about 3 mm.

* * * * *